US010540397B2

(12) United States Patent
Vimberg et al.

(10) Patent No.: US 10,540,397 B2
(45) Date of Patent: Jan. 21, 2020

(54) ALGORITHM TO CHECK COMPATIBILITY OF BUSINESS OBJECT TYPES TO PREVENT BUSINESS CATALOG CORRUPTION ON RESOURCE UPDATE

(71) Applicant: Oracle International Corporation, Redwood Shores, CA (US)

(72) Inventors: Juan Ignacio Vimberg, Foster City, CA (US); Rodolfo José Cruz, Foster City, CA (US); Esteban Alejandro Capillo Carril, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 232 days.

(21) Appl. No.: 15/653,255

(22) Filed: Jul. 18, 2017

(65) Prior Publication Data

US 2018/0075048 A1    Mar. 15, 2018

Related U.S. Application Data

(60) Provisional application No. 62/395,238, filed on Sep. 15, 2016.

(51) Int. Cl.
*G06F 16/23*    (2019.01)
*G06F 16/84*    (2019.01)

(52) U.S. Cl.
CPC .............. *G06F 16/88* (2019.01); *G06F 16/23* (2019.01)

(58) Field of Classification Search
CPC ..... G06F 16/2465; G06F 16/21; G06F 16/258
See application file for complete search history.

(56) References Cited

U.S. PATENT DOCUMENTS

| | | | |
|---|---|---|---|
| 2007/0005786 A1* | 1/2007 | Kumar | G06F 8/656 709/230 |
| 2011/0184990 A1* | 7/2011 | Murphy | G06F 8/20 707/791 |

* cited by examiner

*Primary Examiner* — Jeff A Burke
*Assistant Examiner* — Cindy Nguyen
(74) *Attorney, Agent, or Firm* — Trellis IP Law Group, PC (57) ABSTRACT

Implementations include a resource compatibility engine and method configured to verify resource compatibility when importing schemas and formats such as XSD and WSDL into a database table such as a business catalog. The resource compatibility engine may be configured to prevent possible catalog corruption from importing file types that do not match. The resource compatibility engine may also be employed to identify which are the resource file types that need to be overwritten in case of an update and provides useful feedback in case the import is not successful.

20 Claims, 7 Drawing Sheets

FIG. 1

```
                                                                    116
overrides = Map<oldFile, newFile>
for each (newFile : newFiles) {
  for each (type : newFile.getTypes()}              200
    { if(catalog.contains(type) {
      oldFile = catalog.getFileThatContains(type)
      if(isBorderase(oldFile,newFile)) {
    throw exception BorderCase
      }
      catalog.replaceValidation(oldFile,n ewFile)
      override.put(oldFile, newFile)
    }
  }
}
//On commit
for each (oldFile : overrides.getKeys()){
   //We may or may not change the file name, only it's content
   VFileSystem.replaceContent(oldFile, overrides.get(oldFile))
 }
```

FIG. 2

```
catalog.replaceValidation(oldFile, newfile)
if(newFile.hasDependencies()) {
   //Warn user that we will ignore references
}
//We may or may not want to change the file name, only it's content
VFileSystem.replaceContent(oldFile, overrides.get(oldFile))
```

ALGORITHM TO CHECK COMPATIBILITY OF BUSINESS OBJECT TYPES TO PREVENT BUSINESS CATALOG CORRUPTION ON RESOURCE UPDATE

CROSS-REFERENCE TO RELATED APPLICATIONS

This application claims priority from U.S. Provisional Patent Application Ser. No. 62/395,238, entitled ALGORITHM TO CHECK COMPATIBILITY OF BUSINESS OBJECT TYPES TO PREVENT BUSINESS CATALOG CORRUPTION ON RESOURCE UPDATE (XSD & WSDL), filed on Sep. 15, 2016, which is hereby incorporated by reference as if set forth in full in this application for all purposes.

This patent application relates to the following patent applications: application Ser. No. 15/434,475 entitled AUTOMATIC DISASTER RECOVERY MECHANISM FOR FILE-BASED VERSION CONTROL SYSTEM USING LIGHTWEIGHT BACKUPS filed on Feb. 16, 2017; application Ser. No. 15/434,513 entitled NETWORK PARTITION TOLERANCE IN A HIGH AVAILABLE CENTRALIZED VCS IMPLEMENTATION filed on Feb. 16, 2017; application Ser. No. 15/469,343 entitled "ARCHITECTURAL DESIGN TO ENABLE BI-DIRECTIONAL SERVICE REGISTRATION AND INTERACTION AMONG CLUSTERS filed Mar. 24, 2017, and Application No. 62/395,306 entitled DEPLOYMENT ASSET MANAGEMENT filed on Sep. 15, 2016 all of which are hereby incorporated by reference as if set forth in full in this application for all purposes.

BACKGROUND

The following relates generally to importing and verifying the compatibility of files and resources imported using links called by schemas, such as XSD and WSDL.

Currently a business process user who wants to introspect some schemas or definitions, such as XSD, WSDL, etc., which are remote and/or include external references resource links (e.g., imports that include Uniform Resource Links (URLs) that point to resources) provides a set of URLs representing the root resources the user wants to add. Unfortunately, to introduce external schemas to an application a user must manually download and bundle the schemas, and the schema's dependencies, into a file with a particular structure and then import the file. Such a process is extremely cumbersome and inefficient.

As external reference URLs may change unexpectedly, which often "breaks" the resource link, external references could be invalid when called. Because such resources are often called and parsed each time a project or file is loaded, a broken resource link may cause the user's project to fail. In addition, introducing new resources or updating existing ones, could lead to inconsistencies in the project operation.

In addition, even though objects may be introspected from valid schemas or definitions, current prior art methods of importing files may invariably import objects of the same type, which may corrupt databases, catalogs, etc.

Further, some existing prior art attempts to map or model between operations, such as WSDL calls, and where they cannot map between operations, they create a flag so that developers can manually resolve the conflicts. Such mapping and manual resolutions are time consuming and inefficient.

Therefore, what is needed is a system and method that allows a user to analyze schemas and definitions having links to remote resources associated with a project, such as a business catalog, to determine and repair compatibility issues of the schemas or definitions before loading and/or updating the project.

SUMMARY

Implementations include a resource compatibility engine configured to verify resource compatibility when importing schemas, definitions, and formats such as XML Schema Definition (XSD), Web Services Description Language (WSDL), and the like, into a storage location such as a database. In one implementation, a database storage location may be a table, such as a business catalog, which is used as a repository for storing components used to implement some flow objects in a processes, stored for example as Business Process Modeling Notation (BPMN). The algorithm may be configured to provide notification for and/or prevent possible catalog corruption from importing resource file types that do not match within a threshold match criteria. The algorithm may also be used to identify which resource file types will be overwritten in case of an update and provides useful feedback in case the import is not successful.

In an implementation, when a user imports a schema or definition, dependencies are downloaded thereby generating a self-contained project. A naming convention is used to in conjunction with an update feature to update types and/or service definitions and allow updated and/or new resources to be added a project.

In exemplary implementations, in order to manage the import and/or update of a project, a resource compatibility engine analyzes possible scenarios making a distinction between updating and importing. For example, during an update, the resource compatibility engine may be configured to replace the contents of a given file (e.g., project) with the contents of new resources provided, for example, by the user.

During the update, to promote processor utilization efficiency, the user has the option of configuring the resource compatibility engine to replace the files without necessarily updating dependencies or configuring the resource compatibility engine to use a recursive process to validate and update the dependencies. In addition, during importing the resource compatibility engine may be configure to add new resources to the project, validate that the references are connected to valid resources, and check that no virus has been imported.

In exemplary implementations, a method is employed to verify the compatibility of files for addition to or updating base files. The method includes receiving a first file including a first set of external resource links and a second file including a second set of external resource links, traversing a first set of nodes of the first file in accordance with dependencies of the first set of external resource links to determine a first set of resource file types associated with the first file, traversing a second set of nodes of the second file in accordance with dependencies of the second set of external resource links to determine a second set of resource file types associated with the second file, and determining whether the first set of resource file types and second set of resource file types match within an update threshold. If an update threshold is met, then prior to updating the contents of the first file with the contents of the second file, initiating a multilevel resource compatibility verification process configured to verify the second file is compatible with the first file by employing at least a first level of compatibility analysis and a second level of compatibility analysis configured to verify at least two different compatibility criteria between a first set of resource files associated with the first set of external resource links and a second set of resources files associated with the second set of external resource links, If the multilevel resource compatibility verification process verifies that the first file is within a compatibility threshold, then updating the first file with the contents of the second file. However, if the multilevel resource compatibility verification process verifies that the file is not within a compatibility threshold then flagging the second file as incompatible. If the update threshold is not met, then adding the second set of external resources to the first file.

A further understanding of the nature and the advantages of particular embodiments disclosed herein may be realized by reference of the remaining portions of the specification and the attached drawings.

DETAILED DESCRIPTION OF EMBODIMENTS

Figure 1:
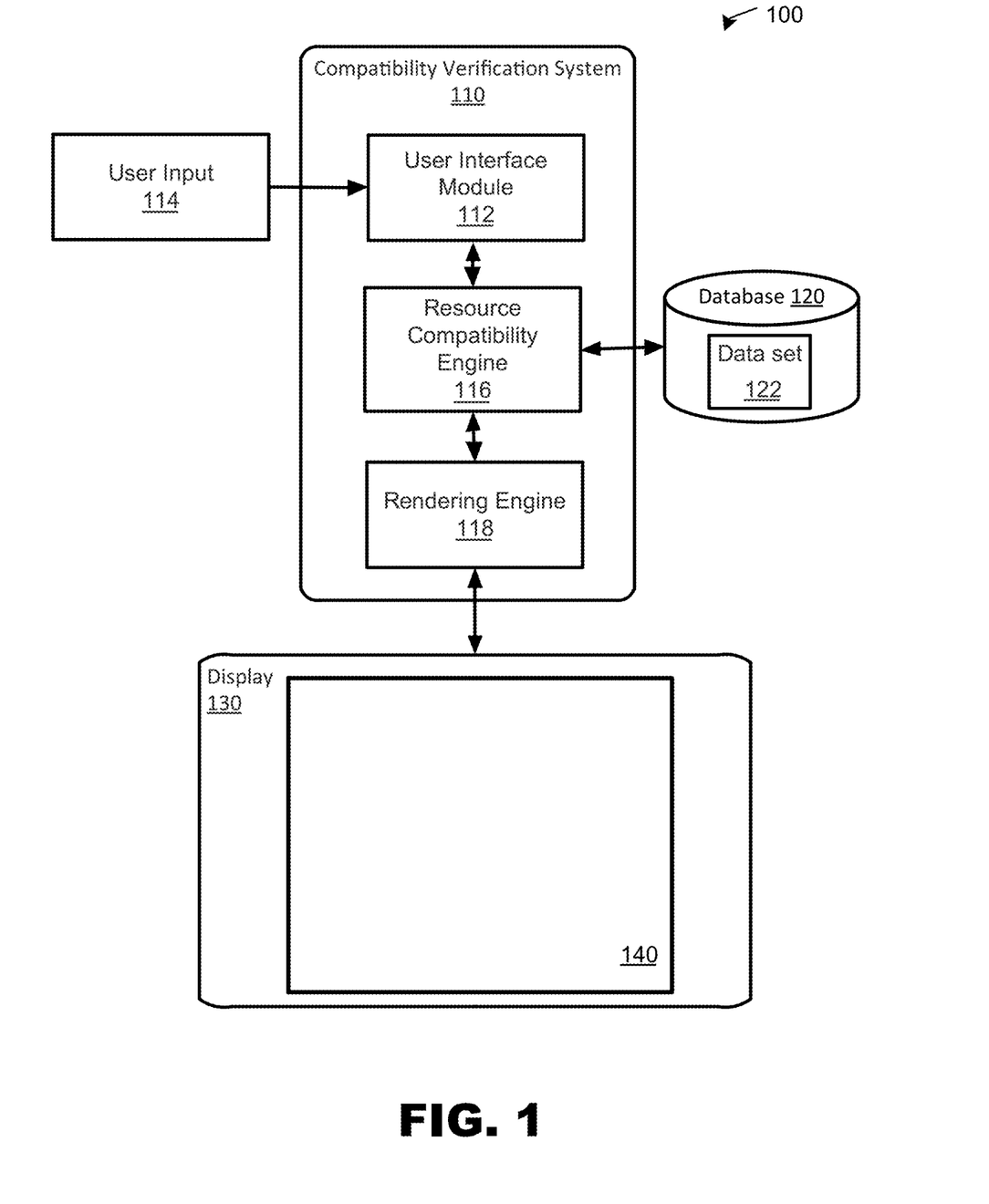
FIG. 1 is a high level illustration of a system for verifying schema compatibility.

FIG. 1 is a high-level block diagram of an exemplary computing system 100 for providing resource verification. Computing system 100 may be any computing system, such as an enterprise computing environment, client-server system, and the like. Computing system 100 includes compatibility verification system 110 configured to process data received from a user interface 114, such as a keyboard, mouse, etc., with regard to verifying and repairing internal and external resource and dependency compatibility, converting, modeling, data binding, maintenance, data elements, information, etc. as described herein.

Note that the computing system 100 presents a particular example implementation, where computer code for implementing embodiments may be implemented, at least in part, on a server. However, embodiments are not limited thereto. For example, a client-side software application may implement compatibility verification system 110, or portions thereof, in accordance with the present teachings without requiring communications between the client-side software application and a server.

In one exemplary implementation, compatibility verification system 110 is connected to display 130 configured to display data 140 (e.g. graphical data), for example, to a user thereof. Display 130 may be a passive or an active display, adapted to allow a user to view and interact with data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to introspect, process, convert, model, generate, deploy, maintain, and update data 140.

In other implementations, computing system 100 may include a data source such as database 120. Database 120 may be connected to the compatibility verification system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to data attributes, data hierarchy, nodal positions, values, summations, algorithms, code (e.g., C++, Javascript, JSON, etc.), source, security, hashes, and the like. In addition, data sets 122 may also contain other data, data elements, and information such as Uniform Resource Locators (URLs), eXtensible Markup Language (XML), schemas, definitions, files, resources, dependencies, metadata, labels, development-time information, run-time information, configuration information, API, interface component information, library information, pointers, and the like.

Compatibility verification system 110 may include user interface module 112, resource compatibility engine 116, and rendering engine 118. User interface module 112 may be configured to receive and process data signals and information received from user interface 114. For example, user interface module 112 may be adapted to receive and process data from user input associated with data 122 for processing via compatibility verification system 110.

In an exemplary implementation, resource compatibility engine 116 may be adapted to receive data from user interface 114 and/or database 120 for processing thereof. In one configuration, resource compatibility engine 116 is a software engine configured to receive and process input data from a user thereof pertaining to data 140 from user interface module 114, database 120, external databases, the Internet, and the like in order to process and validate resources prior to updating schemas and definitions contained in for example, XML Schema and documents such as XSD, WDSL, and the like.

Resource compatibility engine 116 may receive existing data sets 122 from database 120 for processing thereof. Such data sets 122 may include and represent a composite of separate data sets 122 and data elements pertaining to, for example, business catalogs, organizational data, which may include employment data, salary data, personnel data, and the like. In addition, data sets 122 may include other types of data, data elements, and information such as contact data, sales data, production data, scientific data, financial data, medical data, census data, and the like.

Resource compatibility engine 116 in other implementations may be configured as a data analysis tool to perform analysis functions associated with data 122. Such analysis functions may include compatibility verification, reflection—including introspection and the ability for resource compatibility engine 116 to manipulate values, meta-data, properties and/or functions of an object at runtime, recursion, traversing nodes of data hierarchies, determining the attributes associated with the data, determining the type of data, determining the values of the data, determining the relationships to other data, interpreting metadata associated with the data, checking for exceptions, and the like. For example, resource compatibility engine 116 may be configured to receive and analyze data sets 122 to determine whether to sanitize a name space, determine name collisions, data processing instructions, data attributes, data hierarchy, nodes, nodal positions within the hierarchy, values, summations, algorithms, source, security, hashes, and the like, associated with data sets 122.

In some implementations, resource compatibility engine 116 provides a multistep compatibility verification process including pre-change and post-change processes. For example, prior to committing changes to a project, resource compatibility engine operates 116 may be configured to provide a simulation, such as an update or import simulation, before importing and/or applying changes to the project. Such simulations may provide feedback of the resources to be added and information and any problems encountered such as malformed resources, missing dependencies, wrong dependency references, system conflicts, and the like. If the resource compatibility engine 116 does not detect an issue, or a waiver from a user pertaining to accepting errors, or an error or issue within a predefined error threshold, resource compatibility engine 116 allows the user to commit such changes to the project.

In other scenarios as described further herein, where a resource contains different information relative to a prior version of the resource that is being replaced or updated, resource compatibility engine 116 may be employed to analyze, detect, and process such differences. In this scenario, prior to the update or replacement of the older resource, resource compatibility engine 116 is configured to analyze the differences between the older and new version of the resource to determine if the differences between are beyond a compatibility threshold. If so, then resource compatibility engine 116 may provide a user with a message such as an error warning, alert, and the like.

Rendering engine 118 may be configured to receive configuration data pertaining to data 140, associated data sets 122, and other data associated with data sets 122 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122. In one implementation, upon receiving instruction from a user, for example, through user interface 114, rendering engine 118 may be configured to generate a real-time display of interactive changes being made to data 140 by a user thereof.

Figure 2:
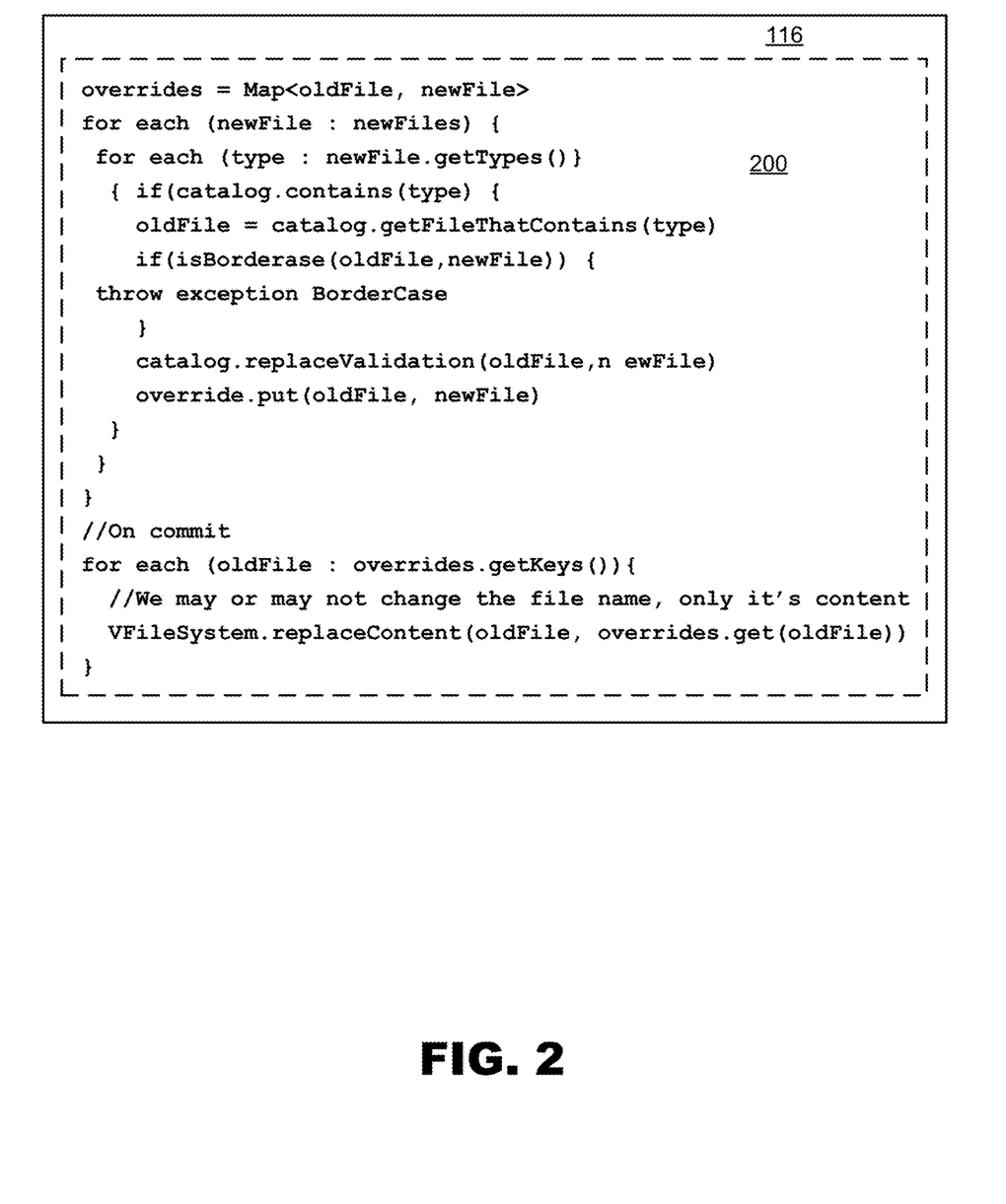
FIG. 2 is pseudo code describing portions of a resource compatibility algorithm for a batch update.

FIG. 2 is pseudo code for a batch update describing portions of a resource compatibility algorithm employed, for example, by resource compatibility engine 116. This is the case where one or more resources added during an import contain a type already defined in a database, catalog, etc., being updated. For example, if certain files are already defined in a catalog, resource compatibility engine 116 will analyze such files and may be configured to provide warnings that such files that are already defined will be updated if the user proceeds. If the user chooses to proceed with the update, the old files will be updated with the new content. In some implementations, in order to avoid breaking internal and external references, resource compatibility engine 116 will check, verify, and maintain prior filenames to avoid breaking such references.

In some boarder case scenarios, a 1:1 relationship between the old file and the new file is often required to prevent errors. However, in other boarder case scenarios, while the old and new file may not match in every respect, the old and new files are often interchangeable as some differences, conflicts, etc. may be benign to the update. When the old and new file are not interchangeable due to, for example, a naming conflict, resource compatibility engine 116 may be configured to generate a message or alert explaining which files and types are conflicting so that resource compatibility engine 116 may be configured to provide alerts pertaining to such files and types in order to resolve conflicts, errors, etc.

In addition, resource compatibility engine 116 may be configured to analyze which portions of the files and types are in conflict and use a recursive process of change and verification to automatically correct conflict, errors, etc. For example, if an object definition was changed due to an updated process requirement to include for example, "Oracle" at the end of each process definition, resource compatibility engine 116 automatically looks up the new process requirement and updates the object definition and then verifies the updated object is valid. Such conflict correction directly improves processor function by minimizing or eliminating system errors that would normally require additional processor resources to detect and resolve once software updates, imports, and/or changes have been processed.

Figure 3:
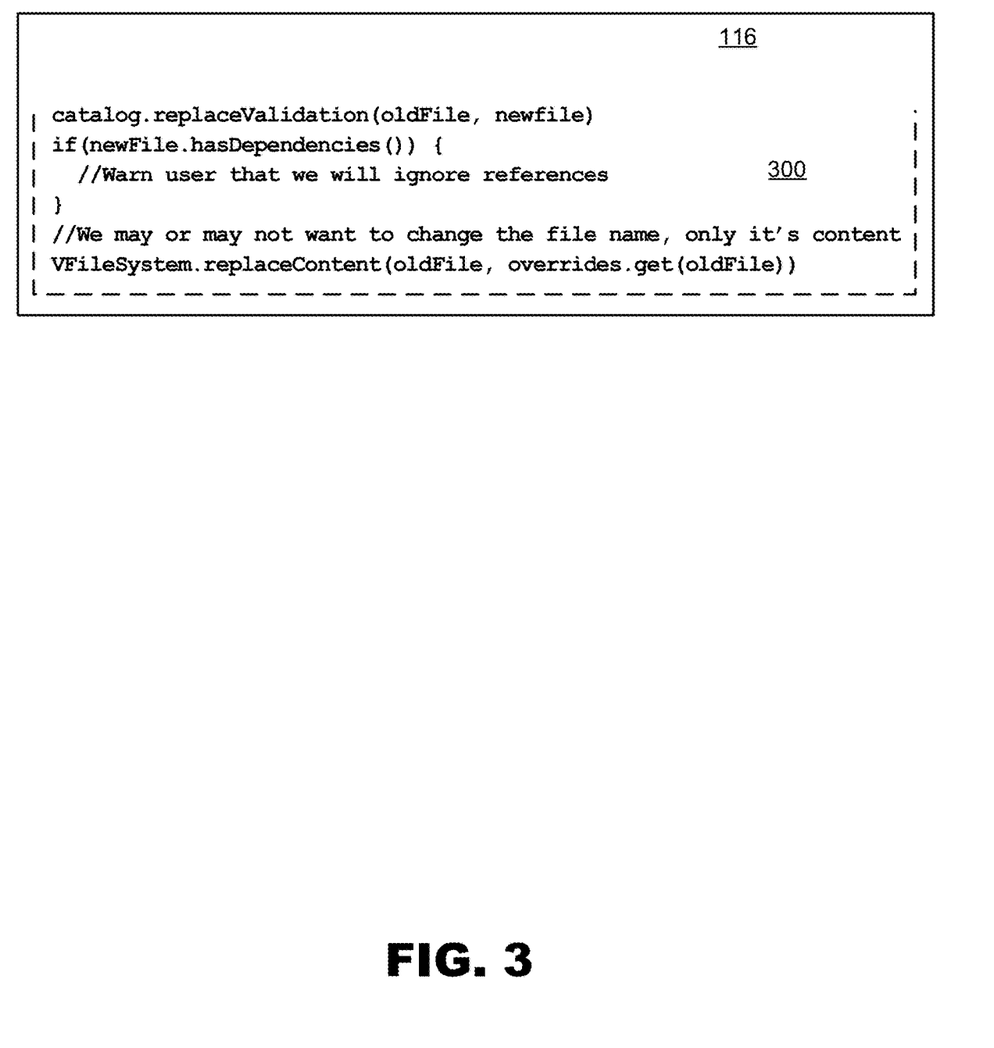
FIG. 3 is pseudo code describing portions of a resource compatibility algorithm for a single update.

FIG. 3 is pseudo code describing portions of a resource compatibility algorithm for a single update, employed for example, by resource compatibility engine 116. In some implementations, for a single file update resource compatibility engine 116 utilizes the file name from which the update was triggered as the root file name. In addition, since external links are typically not part of a single file update, external links are generally not traced. However, if a file is provided that has references, resource compatibility engine 116 may be configured to analyze the file to provide an alert, trace the external links, and the like.

For example, to improve the speed and efficiency of the update generally resource compatibility engine 116 may be configured to only replace the root file content's replaced with the root resource file provided and not trace external links. However, in situations where the resource provided contains links or references to external resources, resource compatibility engine 116 may be configured to generate warnings to indicate that the external references may be selectively traced or ignored allowing the user to selectively include one or more of the other references in the update.

In addition, resource compatibility engine 116 may be configured to analyze the external links and using a recursive process of change and verification that automatically determines whether to trace such external links. For example, if the external link is used to call another process that may have changed, resource compatibility engine 116 may trace the external link and verify that it meets the current required version. If the resource requires updating for example by being incorrect, out of date, etc., then resource compatibility engine 116 may use the recursive process to update the resource connected to the external link, if an update is available.

In some implementations, when the user updates a resource, resource compatibility engine 116 may process at least some of the following checks and verifications to avoid inconsistencies in the project. In this scenario, R is the original resource and R' is the new resource.

1. Resource compatibility engine 116 verifies that types from R not being referenced in the project do not need to be present in R'

2. Resource compatibility engine 116 verifies types from R being referenced by the project, are present in R', or subtypes from them (inheritance). New Types, etc., included in R' are usually allowed.

In implementations, to further guarantee that the project will still compile after the update as part of validations implemented before updating the resource, resource compatibility engine 116 checks may be configured to check existing types being updated to determine if the existing types must be updated by types that are compatible with the existing types.

In other implementations, to check resources compatible resource compatibility engine 116 implements at least some of the following:

1. Verifies the schema being updated does not have inheritance

2. Verifies the concrete section of the schema does not require validation.

3. Verifies the catalog generates one and only one constructor per, for example, WSDLTypeImpl. Such constructor may be parameter-less and returns, for example, a type ref for the WSDLTypeImpl being constructed.

4. Allows the arguments of an operation to change order.

5. Locks operation names.

6. Rules 4 and 5 also apply to Faults

7. Verifies that modifiers of an operation match.

In cases of deleting resources compatibility engine 116 may be configured to provide a delete operation used to delete only the resources associated with the given URLs, i.e. it will ignore the reference between files and only stick to those URLs passed as input.

Before removing resources, a compile operation provided by compatibility engine 116, such as RESOURCE MANAGER by Oracle, will validate that the project still compiles without the resources about to removed.

In one implementation, resource compatibility engine 116 may be configured with a delete operation employed to return a message such as "Result Preview" than can be used to communicate the changes resource compatibility engine 116 is about to make, which may then be committed to perform those changes in the project.

Figure 4:
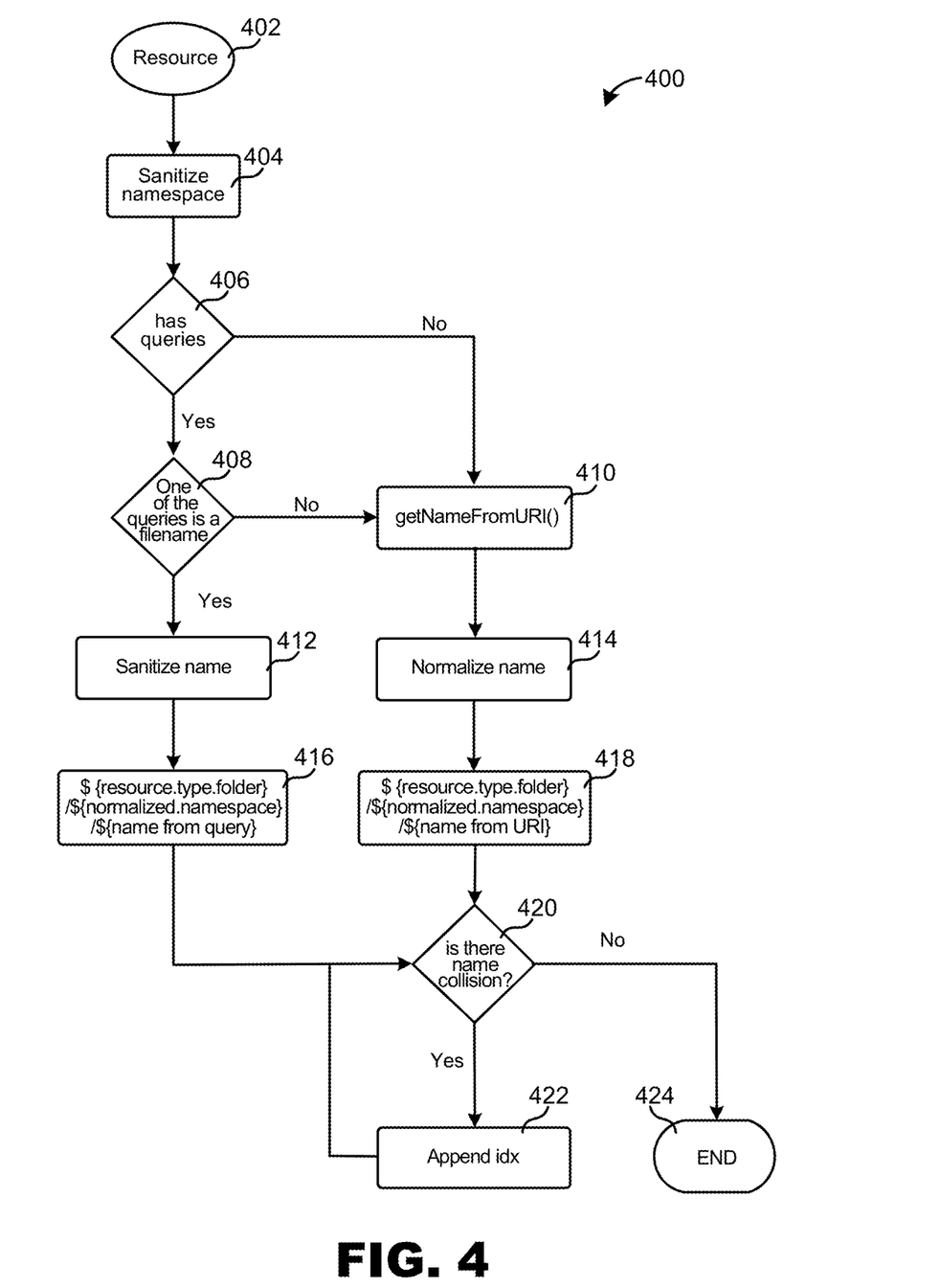
FIG. 4 is a high level flow diagram of a process used to provide names to new resources.

FIG. 4 is a high level flow diagram of a process 400 used to provide names to new resources. In some scenarios, resources being added to a project will have a file name once downloaded. Some resources are already local and therefore will usually already have a name, but external resources could be received from some data links such as URL that is named so that it can't be adapted as a file name in a straightforward manner. In such scenarios, resource compatibility engine 116 executes a naming convention to selectively name new resources.

Method 400 may be initiated, for example, by initiating compatibility verification system 110. At 402 a resource is received to be added to a database file, such as a project file. At 404, the namespace is sanitized to make sure that the file types to be imported are already in the application. If there are some names that collide, then method 400 determines that this is an update and not just an import.

At 406, method 400 determines whether the resource has queries. If so, method 400 proceeds to 408. If not, method 400 proceeds to 412. At 408, method 400 determines if the queries include a filename. If the queries include a filename, then method 400 proceeds to 412 to sanitize the filename to meet the requirements of the project, and proceeds to 416 to update the project with the sanitized name, then method 400 proceeds to 420.

At 408, if one of the queries does not include a file name, then method 400 proceeds to 410. At 410, method 400 derives the from the resource link such as a URL, then at 414, method 400 normalizes the name to the project, and at 418 updates the resource names to the normalized name. After the file name is normalized method 400 proceeds to 420.

At 408, if one of the queries includes a filename, the method 400 proceeds to 412 to sanitize the filename. In one implementation, method 400 sanitizes the filename by checking to see that there is only one namespace and no two types of files with the same namespace and filename in the project.

At 420, method 4000 determines if there is a filename collision. If so, method 400 proceeds to 422 to flag or attempt to correct the collision. For example, if there is more than one namespace or two types of files have the same filename in the project, method 400 may be configured to provide an alert, or selection to a user to choose which namespace or file name to use. If at 420 there is no name collision then method 400 ends at 424.

Figure 5:
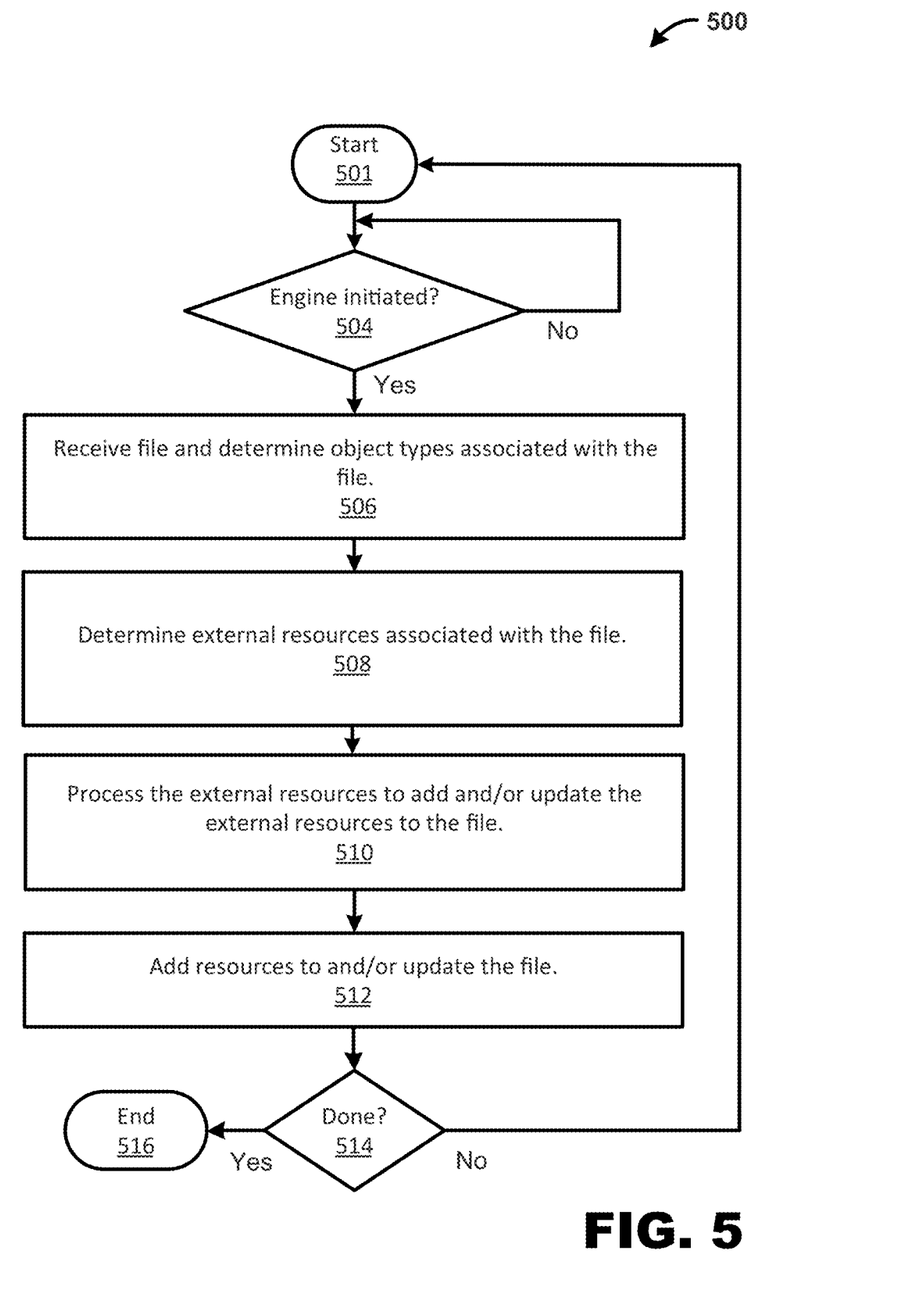
FIG. 5 is a flow diagram of an example method adapted for use with implementations, and variations thereof, illustrated in FIGS. 1-4, and 6.

FIG. 5 is a flow diagram of an example method 500 adapted for use with implementations, and variations thereof, illustrated in FIGS. 1-4, and 6. Method 500 may be entered into at 510 when, for example, compatibility verification system 110 is initiated to check the compatibility of a resource. At 504, method 500 determines whether a compatibility engine such as resource compatibility engine 116 has been initiated. If not, method 500 returns to 501. If so, method 500 proceeds to 506 to receive a file for import into, for example, a catalog and determine the object names and types of objects.

At 508, method 500 determines the type of external resources associated with the file. Method 500 may traverse the nodes of the file to determine the external resources links. For example, if a file has one or more URL links to external resources, resource compatibility engine 116 may be invoked to trace the one or more URL links to determine whether the state of the URL links is valid or invalid. Further, since in some instances some resources may or may not impact a project (e.g. links to general information, etc.), compatibility engine 116 may be invoked to determine whether the linked resources are extraneous, optional, unnecessary, and the like.

At 510, method 500 processes the external resources to determine whether the resources are being updated and/or whether external resources are being added. If the file is being updated, then method 500 traverses the nodes of the file schema and determines whether the resources are compatible with the existing file being updated. If however, method 500 determines that resources are being added, then to improve computing efficiency, method 500 may or may not traverse the nodes of the file schema depending, for example, on user preference.

At 514, method 500 determines if the compatibility processing is complete. If not, method 500 returns to 501. However, if the processing is complete then method 500 proceeds to 516 and ends.

Figure 6:
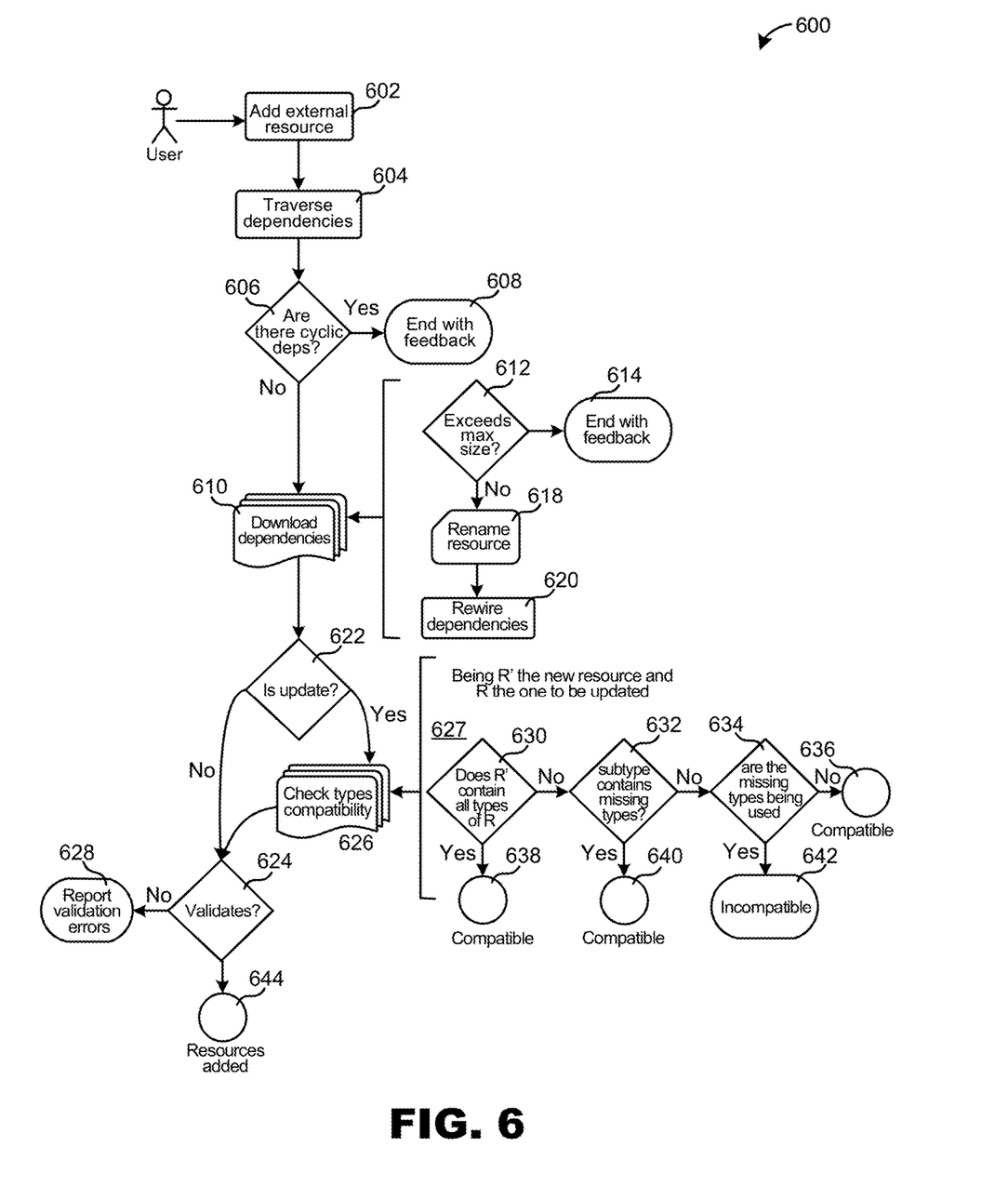
FIG. 6 is a flow diagram of an example method adapted for use with implementations, and variations thereof, illustrated for example in FIG. 5 for importing external resources into a schema.

FIG. 6 is a flow diagram of an example method 600 adapted for use with implementations, and variations thereof, illustrated in FIG. 5, for example, at 512, for importing external resources into a schema. As illustrated, method 600 performs steps used to validate, add and/or update external resources into an application.

At 602, a user introduces a reference to the new resource to be added. For example, a resource, for this example is referred to as a "root resource," is added by having a URL point to an XSD resource.

At 604, method 600 traverses the nodes of the dependencies and selective fetches some or all the resources referenced from the root resource. In some scenarios, method 600 fetches the resources recursively from the root until method 600 has selectively fetched all the resources, or a selection of resources from the root resource. In addition, method 600 checks for cyclic dependencies. That is for example when a resource A depends on a resource B that depends on A. If method 600 detects cyclical dependency scenarios, method 600 may issue a warning indicating that the provided resource had a cyclic decadency and explaining were the dependency cycle is. In some implementations, such feedback is provided, for example, to an administrator, user, etc., to be able to fix the dependency if needed.

In addition, in one implementation, method 600 may be configured to further analyze and repair such cyclic dependencies. For example, method 600 may analyze the cyclic dependency in order to repair the dependency. If, for example, the cyclic dependency was related to an error in one of the resources, then method 600 may be configured to repair either resource A or B to resolve the cyclic dependency cycle.

At 610, dependencies are downloaded. At 610, method 600 performs the following steps for each of the resources to be added: first at 612, method 600 checks if it exceeds the maximum file size. If it does not exceed the maximum file size, then at 618, method 600 chooses a filename for the resource based on a process such as random file selection, user input, the algorithm illustrated in FIG. 4, described herein, and the like. At 620, method 600 chooses the filename for the resource and renames references on all or selected resources.

At 622, method 600 determines if these are new resources or an update to one or more existing resources. In one implementation, to determine whether the new resources are part of an update to the existing project, or new resources to be added to the project, method 600 processes all or a selected number of linked resource file types inside the downloaded resources and compares them with all or selected resources already in the project. In this scenario, the comparison takes into account filename and namespace, but may take other attributes into account as well.

In some implementations, method 600 checks update status against an update threshold, that may include a threshold based on the whether all or a selected number of linked resource file types of the downloaded file match all or a selected number of linked resource file types of the project prior to being updated. In this scenario, the threshold may be set by the system 100, user, etc., to allow for some adjustable variation between the linked resources of the downloaded file and the current resources. For example, the download file may contain external links to external resources such as extra metadata, notes, etc., that are superfluous to the update.

At 622, if method 600 determines this is update operation then method 600 proceeds to verify compatibility. At 627, method 600 initiates a multilevel resource compatibility verification process containing at least two levels of compatibility analysis configured to verify compatibility of external resources. In addition, multilevel resource compatibility verification process may be configured to verify at least two different compatibility criteria between resource files associated with resource links from the project before updating and resources files associated with the external resource links of the file being imported.

In one implementation, at 630, method 600 checks if the new resource contains all, or a selected number, of the resource file types of the one it's going to overwrite. If so, method 600 labels the file as compatible at 638. If not, at 632, method 600 checks its subtypes.

If at 632 method 600 determines that the file subtypes contain the missing resource file types, then method proceeds to 640 and labels the file as compatible. If not, method 600 proceeds to 634 to determine if the missing resource file types are used in the project. If so, then at 642 method 600 determines that the file is incompatible. If not, then at 636, method 600 labels the file is compatible.

At 626, if the file is compatible, method 600 builds a new version of the files (business catalog) and at 624 runs a validation on the new version. If at 624, the validation is successful the resource is added to the file. If not, at 628 method 600 generates an error message.

Figure 7:
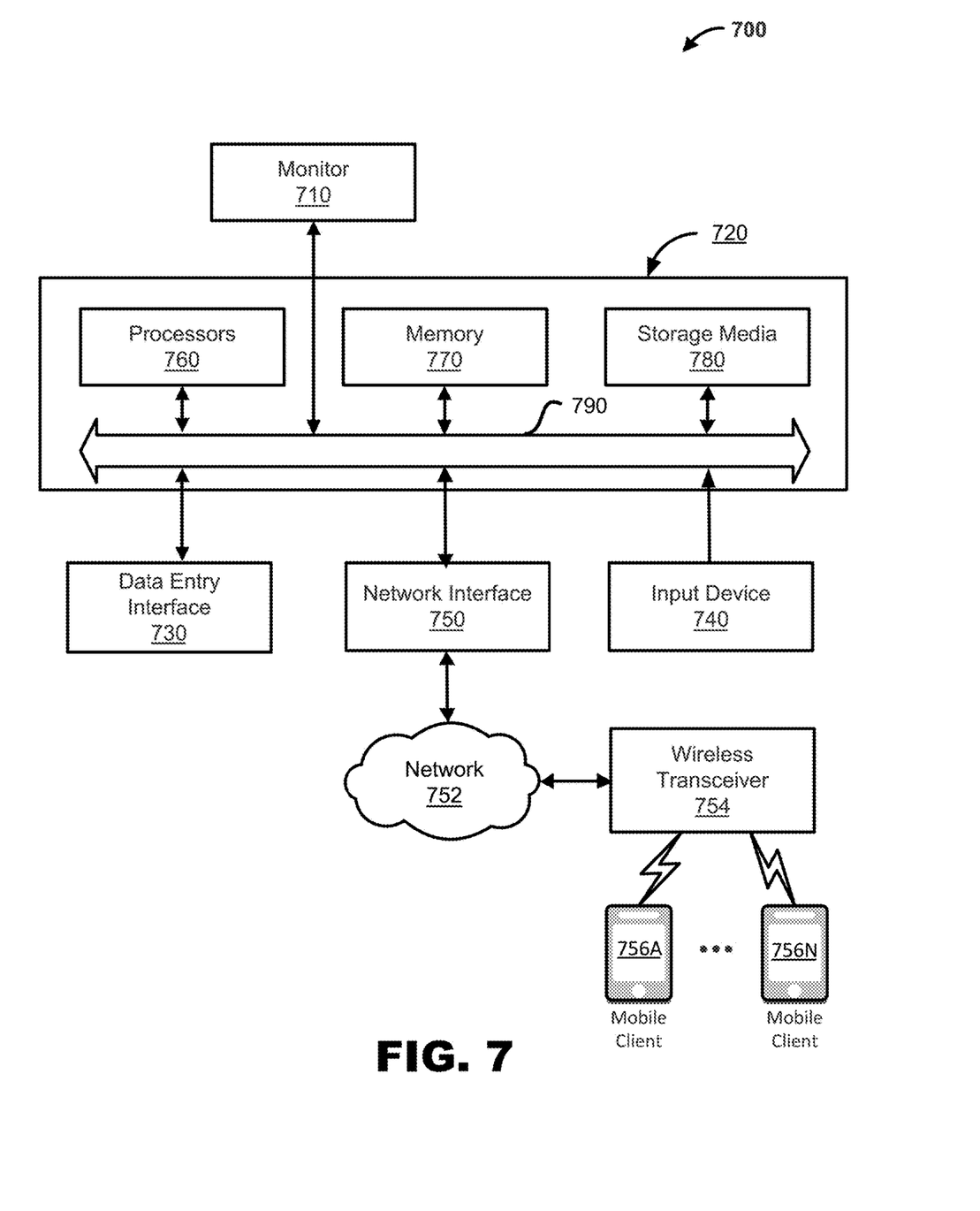
FIG. 7 is a high-level block diagram of an exemplary computer and communication system.

FIG. 7 is a block diagram of an exemplary computer system 700 for use with implementations described in FIGS. 1-6. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as one or more processors 760, and memory storage devices, such as memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention.

Memory 770 and Storage media 780 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including one or more instructions executable by one or more processors for:
   receiving a first file including a first set of external resource links and a second file including a second set of external resource links;
   traversing a first set of nodes of the first file in accordance with dependencies of the first set of external resource links to determine a first set of resource file types associated with the first file;
   traversing a second set of nodes of the second file in accordance with dependencies of the second set of external resource links to determine a second set of resource file types associated with the second file;
   determining whether the first set of resource file types and second set of resource file types match within an update threshold;
   wherein if an update threshold is met, then prior to updating contents of the first file with the contents of the second file, initiating a multilevel resource compatibility verification process configured to verify the second file is compatible with the first file by employing at least a first level of compatibility analysis and a second level of compatibility analysis configured to verify at least two different compatibility criteria between a first set of resource file types associated with the first set of external resource links and a second set of resources file types associated with the second set of external resource links;
   if the multilevel resource compatibility verification process verifies that the second file is not within a compatibility threshold then flagging the second file as incompatible and initiating a recursive process configured to automatically correct at least some conflicts between the first set of resource file types and the second set of resource file types;
   if the multilevel resource compatibility verification process verifies that the second file is within the compatibility threshold, then updating the first file with the contents of the second file; and
   if the update threshold is not met, then adding the second set of resource file types to the first file.

2. The computer readable medium of claim 1, wherein the first file comprises an XSD schema.

3. The computer readable medium of claim 1, wherein comparing the first set of resource file types of the first file and the second set of resource file types further comprises establishing the update threshold based on matching a selected portion of the first set of resource file types with the second set of resource file types.

4. The computer readable medium of claim 1, wherein the first level of compatibility analysis comprises determining whether the second set of resource file types matches at least a portion of the first set of resources file types.

5. The computer readable medium of claim 1, further comprising:
wherein the second level of compatibility analysis comprises analyzing the second set of resource file types to determine missing resource file types of the second set of resource file type relative to the first set of resource file types.

6. The computer readable medium of claim 5, further comprising:
determining whether at least one resource file subtype from the second set of resource file types matches at least one of the missing resource file types; and
verifying the second file is compatible for updating the first file if the at least one resource file subtype from the second set of resource file types matches at least one of the missing resource file types.

7. The computer readable medium of claim 5, further comprising:
determining whether at least one of missing resource file types is used in a project associated with the first file; and
verifying the second file is incompatible for updating the first file if the at least one of missing resource file type is used in a project associated with the first file.

8. The computer readable medium of claim 1, wherein determining whether the first set of resource file types and second set of resource file types match within an update threshold comprises comparing an account name of the first file with the account name of the second file.

9. The computer readable medium of claim 1, wherein determining whether the first set of resource file types and second set of resource file types match within an update threshold comprises comparing a namespace of the first file with the namespace of the second file.

10. The computer readable medium of claim 1, wherein traversing the first set of nodes of the first file further comprises:
determining whether there are cyclic dependencies; and
if a cyclic dependency is determined then determining whether the cyclic dependency is repairable.

11. A computer implemented method comprising:
receiving a first file including a first set of external resource links and a second file including a second set of external resource links;
traversing a first set of nodes of the first file in accordance with dependencies of the first set of external resource links to determine a first set of resource file types associated with the first file;
traversing a second set of nodes of the second file in accordance with dependencies of the second set of external resource links to determine a second set of resource file types associated with the second file;
determining whether the first set of resource file types and second set of resource file types match within an update threshold;
wherein if an update threshold is met, then prior to updating contents of the first file with the contents of the second file, initiating a multilevel resource compatibility verification process configured to verify the second file is compatible with the first file by employing at least a first level of compatibility analysis and a second level of compatibility analysis configured to verify at least two different compatibility criteria between a first set of resource files associated with the first set of external resource links and a second set of resources files associated with the second set of external resource links;
if the multilevel resource compatibility verification process verifies that the second file is not within a compatibility threshold then flagging the second file as incompatible and initiating a recursive process configured to automatically correct at least some conflicts between the first set of resource file types and the second set of resource file types;
if the multilevel resource compatibility verification process verifies that the second file is within the compatibility threshold, then updating the first file with the contents of the second file; and
if the update threshold is not met, then adding the second set of resource file types to the first file.

12. The method of claim 11, wherein the first file comprises an XSD schema.

13. The method of claim 11, wherein comparing the first set of resource file types of the first file and the second set of resource file types further comprises establishing the update threshold based on matching a selected portion of the first set of resource file types with the second set of resource file types.

14. The method of claim 11, wherein the first level of compatibility analysis comprises determining whether the second set of resource file types matches at least a portion of the first set of resource file types.

15. The method of claim 11, further comprising:
wherein the second level of compatibility analysis comprises analyzing the second set of resource file types to determine missing resource file types of the second set of resource file type relative to the first set of resource file types.

16. The method of claim 15, further comprising:
determining whether at least one resource file subtype from the second set of resource file types matches at least one of the missing resource file types; and
verifying the second file is compatible for updating the first file if the at least one resource file subtype from the second set of resource file types matches at least one of the missing resource file types.

17. The method of claim 15, further comprising:
determining whether at least one of missing resource file types is used in a project associated with the first file; and
verifying the second file is incompatible for updating the first file if the at least one of missing resource file types is used in a project associated with the first file.

18. The method of claim 11, wherein determining whether the first set of resource file types and second set of resource file types match within an update threshold comprises comparing an account name of the first file with the account name of the second file.

19. The method of claim 11, wherein determining whether the first set of resource file types and second set of resource file types match within an update threshold comprises comparing a namespace of the first file with the namespace of the second file.

20. An apparatus for verifying compatibility between files in a computing environment, the computing environment comprising one or more computing devices in communication with a software application that executes software configured to provide information accessible to the one or more computing devices, a computing device of the one or more computing devices configured to:
receive a first file including a first set of external resource links and a second file including a second set of external resource links;

traverse a first set of nodes of the first file in accordance with dependencies of the first set of external resource links to determine a first set of resource file types associated with the first file;

traverse a second set of nodes of the second file in accordance with dependencies of the second set of external resource links to determine a second set of resource file types associated with the second file;

determine whether the first set of resource file types and second set of resource file types match within an update threshold;

wherein if an update threshold is met, then prior to updating contents of the first file with the contents of the second file, initiate a multilevel resource compatibility verification process configured to verify the second file is compatible with the first file by employing at least a first level of compatibility analysis and a second level of compatibility analysis configured to verify at least two different compatibility criteria between a first set of resource files associated with the first set of external resource links and a second set of resources files associated with the second set of external resource links;

if the multilevel resource compatibility verification process verifies that the second file is not within a compatibility threshold then flag the second file as incompatible and initiate a recursive process configured to automatically correct at least some conflicts between the first set of resource file types and the second set of resource file types;

if the multilevel resource compatibility verification process verifies that the second file is within the compatibility threshold, then update the first file with the contents of the second file; and if the update threshold is not met, then add the second set of resource file types to the first file.

* * * * *

UNITED STATES PATENT AND TRADEMARK OFFICE
CERTIFICATE OF CORRECTION

PATENT NO. : 10,540,397 B2
APPLICATION NO. : 15/653255
DATED : January 21, 2020
INVENTOR(S) : Vimberg et al.

It is certified that error appears in the above-identified patent and that said Letters Patent is hereby corrected as shown below:

In the Drawings

On sheet 2 of 7, in FIG. 2, under Reference Numeral 200, Line 9, delete "n ewFile)" and insert -- newFile) --, therefor.

In the Specification

In Column 4, Line 49, delete "WDSL," and insert -- WSDL, --, therefor.

In Column 7, Line 3, after "R'" insert -- . --.

In Column 7, Line 20, after "inheritance" insert -- . --.

In Column 7, Line 29, after "Faults" insert -- . --.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*